United States Patent

Hansel

[15] 3,636,976

[45] Jan. 25, 1972

[54] SUCTION VORTEX ELIMINATOR

[72] Inventor: William B. Hansel, Media, Pa.

[73] Assignee: Sun Oil Company, Philadelphia, Pa.

[22] Filed: Apr. 2, 1970

[21] Appl. No.: 25,107

[52] U.S. Cl. ................................137/590, 61/105, 210/513, 222/464, 222/564
[51] Int. Cl. ....................E03b 11/00, E21f 17/16, B67d 5/60
[58] Field of Search ............417/61; 210/513; 222/464, 564; 137/172, 590; 61/105

[56] References Cited

UNITED STATES PATENTS 2,657,826  11/1953  Ludowitz .......................... 222/564 X
2,372,678  4/1945   McKay .............................. 222/464 X Primary Examiner—Robert M. Walker
Attorney—George L. Church, Donald R. Johnson, Wilmer E. McCorquodale, Jr. and Frank A. Rechif

[57] ABSTRACT

A bowl-shaped member, whose cross-sectional area is large compared to the cross-sectional area of the pipe, is mounted below the pump suction pipe in a subterranean liquid storage tank. This member rests in upright position on the bottom of the tank, with its open end at the top. The member is so designed that it can be collapsed for insertion into the tank, and for withdrawal therefrom, through the suction pipe.

3 Claims, 7 Drawing Figures

INVENTOR:
WILLIAM B. HANSEL
BY G. A. Rechif
ATTY.

PATENTED JAN 25 1972

INVENTOR
WILLIAM B. HANSEL
BY
ATTY

SUCTION VORTEX ELIMINATOR

This invention relates to a suction vortex eliminator useful in subterranean hydrocarbon liquid storage tanks, such as tanks used for the storage of liquid fuel (e.g., gasoline).

Normally, in a subterranean storage tank with which an above ground or surface discharge pump is used, the suction for such pump is obtained by means of a suction pipe (suction stub) mounted vertically in the tank. The bottom open end of this pipe may be cut off at an angle to the vertical of say 45°. The lowermost portion of this pipe would be located at a small distance (e.g., 2 inches) above the tank bottom. Water (produced, for example, as a result of condensation within the tank) collects in the form of a layer on the tank bottom, since it is heavier than the hydrocarbon fuel being stored in the tank.

With this arrangement, it is possible to suck up water from the tank bottom when the end of the suction stub is about 2½ inches or less above the fuel-water interface. This mixing of water with the fuel being pumped is quite undesirable.

To avoid this result, the bottom ends of many suction stubs have been cut off. However, when this is done the tank cannot be pumped down, and the effective storage capacity of the tank is reduced.

One scheme for avoiding the pumping of water, while maintaining tank capacity, is the "floating suction" arrangement described in my copending application, Ser. No. 25,105, filed Apr. 2, 1970. However, the installation of such a floating suction arrangement in an existing tank with an aboveground pump requires the cutting off of the bottom end of the suction stub (leaving the piece cut off lying on the bottom of the tank); it may be considered undesirable in some cases to leave this loose piece of metal pipe in the tank.

An object of this invention is to provide a novel pump suction arrangement for subterranean fuel storage tanks.

Another object is to provide a pump suction arrangement applicable to existing underground fuel storage tanks, the installation of which does not require the cutting off of the pump suction stub present in such tanks.

A further object is to provide a novel pump suction arrangement, for subterranean fuel storage tanks, which will prevent the pumping up of water bottoms from the tank, while avoiding any reduction in the effective storage capacity of the tank.

The objects of this invention are accomplished, briefly, in the following manner:

A flexible bowl-shaped member, which is collapsible to fit within the suction stub of the tank, is inserted down through the check valve and the suction stub, into the tank. This member expands after leaving the suction stub at the tank bottom to assume the shape of a bowl or an inverted umbrella, forming a sump directly under the lower end of the suction stub. The cross-sectional area at the top of the sump is large as compared to the cross-sectional area of the suction stub or pipe.

A detailed description of the invention follows, taken in conjunction with the accompanying drawings, wherein.

Figure 1:
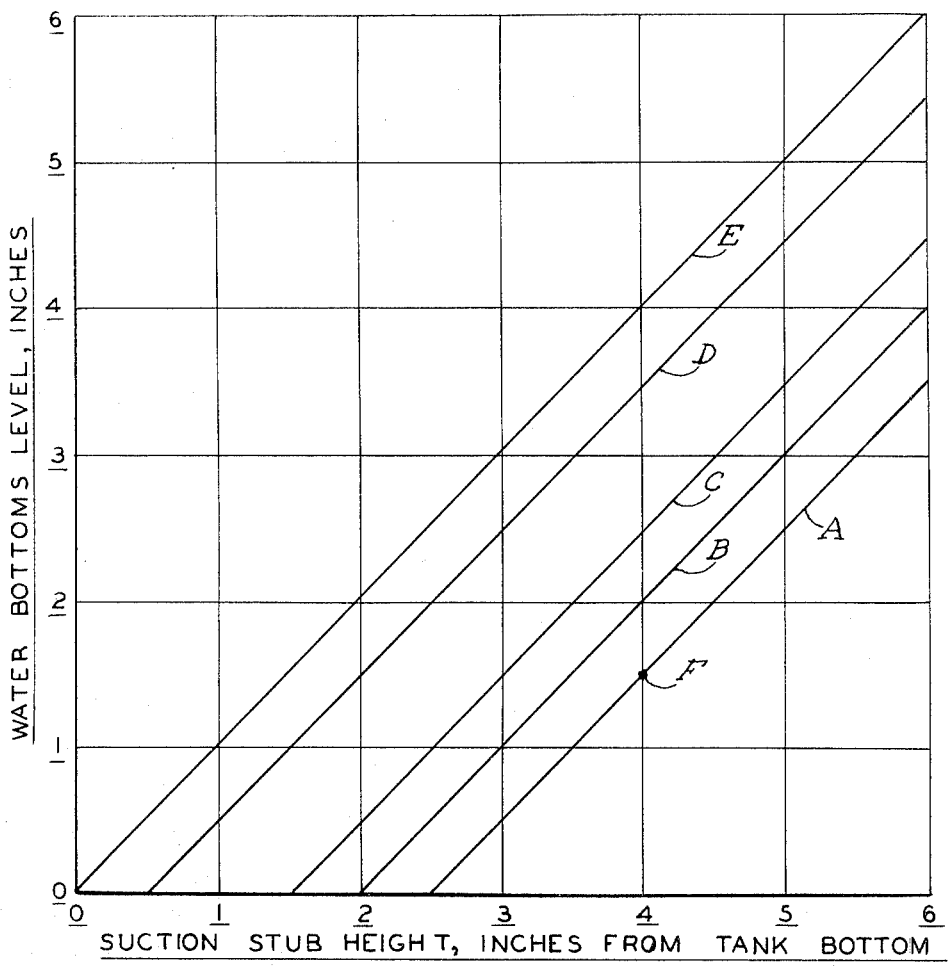
FIG. 1 is a graph showing the water content of gasoline pumped from a tank, as a function of water bottoms level and suction stub height.

Refer first to FIG. 1. This is a graph showing the dependence of the water content of gasoline, being pumped from a tank, on water bottoms level in the tank and on suction stub height. The data for this graph was obtained using a 4,000-gallon tank containing a high-octane gasoline at 65° F., the pumping rate being 12.2 gallons per minute. The pump suction was obtained through a suction stub (pipe) extending vertically from the top of the tank toward the tank bottom.

Curve A is for 0 percent water, the area to the right of this curve on the graph thus representing "clear gasoline." Curve B is for 11 percent water; curve C, 23 percent water; curve D, 60 percent water; curve E, 100 percent water. The area to the left of curve E on the graph thus represents "water," while the area between curves A and E represents "fuel and water mixed." Curve A shows that it is possible to pump up water from the tank bottom when the end of the suction stub is some 2½ inches (or less, of course) above the interface between the fuel (gasoline) and water (it being noted, for example, that one point F on this curve has the coordinates (1) suction stub 4 inches above tank bottom and (2) 1½ inches of water bottoms in the tank).

Figure 2:
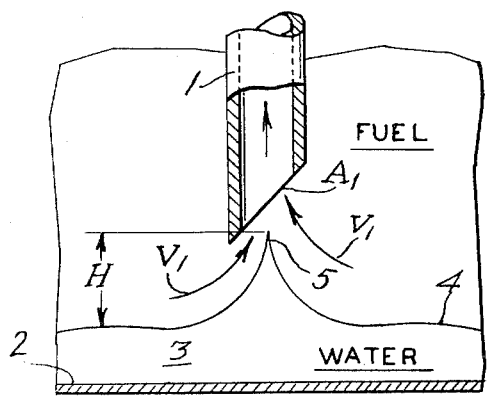
FIG. 2 is a schematic illustration showing the action that occurs, during pumping, at the bottom end of a conventional suction stub.

The mechanism whereby the action mentioned in the preceding paragraph (in connection with curve A) occurs is depicted schematically in FIG. 2. This action has actually been observed in a transparent-walled tank. The suction stub or pipe 1 is illustrated as extending vertically downward toward the bottom 2 of a subterranean tank in which there is a layer 3 of water bottoms below a quantity of fuel, the fuel-water interface being indicated at 4. The inside diameter of the suction stub is approximately 1½ inches, and the bottom end of this stub is normally cut off at an angle of 45° to the longitudinal axis of the pipe, as illustrated.

For any given flow rate such as 12 gallons per minute, the velocity $V_1$ of the fuel being pulled across the fuel-water interface 4 is proportional to the area $A_1$ of the suction stub opening. This rather high velocity of pulling at the water causes the surface of the water to be pulled up, creating an inverted vortex 5 under the stub 1. Measurements in an actual tank show that this vortex can be raised to a height H of approximately 2½ inches at the above-mentioned flow rate. It is postulated that the creation of this inverted vortex as above described is what causes water to be pumped up from the tank bottom when the end of the suction stub is 2½ inches or less above the fuel-water interface.

Figure 3:
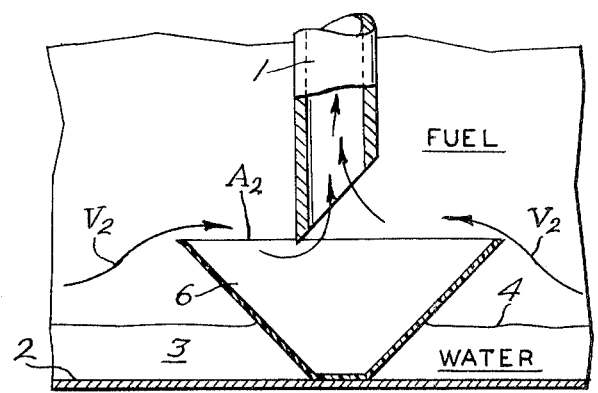
FIG. 3 is a schematic illustration showing the action occurring, during pumping, at the bottom end of a suction stub when utilizing the vortex eliminator of the invention.

Refer now to FIG. 3, which is a schematic depiction of the same type as FIG. 2 but illustrating the action occurring with the present invention. According to this invention, a flexible imperforate dish 6, which when in operating position has the shape of an inverted umbrella or bowl, is installed on the tank bottom 2 with its open end uppermost, below and in vertical alignment with the suction stub 1. The procedure for installing this dish member 6 from the surface will be described hereinafter.

The bowl-shaped member or inverted umbrella member 6 provides a sump directly under the suction stub 1. The diameter of the upper open end of member 6 is approximately 8 inches, and the vertical height of member 6 is slightly greater than 3 inches. In FIG. 3, this sump diameter essentially becomes the new suction stub diameter. This means that, for the same flow rate mentioned in connection with FIG. 2 (the velocity of the fuel pulling across the fuel-water interface 4 being proportional to the area of the suction stub opening), $V_2$ in FIG. 3 is reduced (as compared to $V_1$ in FIG. 2) by approximately a factor of 28, since $A_2$ (the cross-sectional area at the open upper end of the member 6) divided by $A_1$ is in excess of 28. This low velocity $V_2$ reduces markedly the pull on the water, and no inverted vortex of water is formed under the suction stub 1 in FIG. 3.

Since the suction vortex 5 of FIG. 2 is entirely eliminated by the structure described in connection with FIG. 3, the suction vortex eliminator of this invention prevents the pumping of water through the suction stub 1 when there is a water accumulation of 3 inches or less in the bottom of the bank (3 inches being the vertical height of member 6). Since the lowermost edge of stub or pipe 1 lies in approximately the horizontal plane of the upper open end of member 6, it should be apparent that when the fuel-water interface 4 rises to more than 3 inches above the tank bottom, some water will be pumped up through this pipe, even though the inverted vortex has been eliminated. The interior of sump 6 must be kept "dry" (i.e., water-free) in order for the invention to operate as desired.

A scale model of the device illustrated in FIG. 3 has been actually built and tested (in a tank with see through walls); it was found that the device does in face operate as previously described. In addition, a full scale device has been tested in a 4,000-gallon tank; it, too, operates as previously described.

Figure 4:
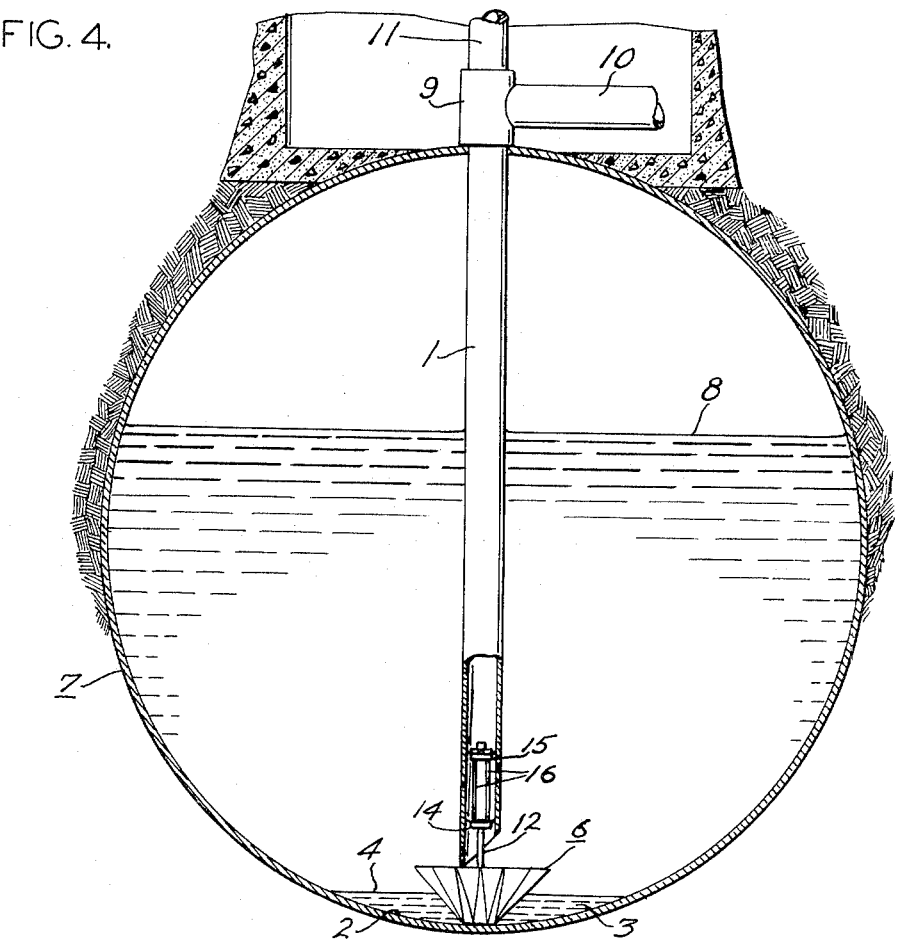
FIG. 4 is a view of the interior of a subterranean liquid fuel storage tank showing the device of the invention in its operating position.

FIG. 4 shows the device of the invention in its operating position, in a subterranean hydrocarbon liquid (fuel) tank. A subterranean fuel (e.g., gasoline) storage tank 7 is shown, this tank being form example cylindrical in outer configuration, with its longitudinal axis substantially horizontal. The water bottoms in the tank are indicated at 3, and the fuel-water interface at 4, the fuel level in the tank being indicated at 8.

A check valve 9 is located at the top of tank 7, outside the same, and from this valve the suction stub 1 extends downwardly, inside the tank, toward the bottom thereof. The check valve has a side outlet fitting 10 which is coupled to the suction or intake of an aboveground discharge pump (not shown), preferably of the positive-displacement-type; this pump ordinarily comprises part of a liquid fuel-dispensing apparatus. Thus, fuel may be pumped from tank 7 through suction pipe 1 and check valve 9 to the fitting 10, and thence to the intake of the discharge pump. The check valve 9 may be removed from its housing when desired, and when so removed straight through access may be had to suction stub 1 (inside tank 7) through the check valve housing, by way of an access pipe 11 which is reachable from the surface of the ground.

The member 6 is illustrated in FIG. 4 in its installed or operating (expanded) position, wherein its lower closed end rests on the bottom 2 of the tank, member 6 being positioned below and in alignment with the suction stub 1, this member having the shape of a bowl or inverted umbrella and the open end thereof facing upwardly. Member 6 is maintained in this operating position, during pumping through the suction stub, by means of a rod 12 having at its lower end an integral disk 13 which is secured to the upper face of a central circular area of member 6; when member 6 is in its operating position it is the lower face of this circular area which engages the tank bottom 2. The upper end of rod 12 is secured to a retaining structure comprising a pair of spaced, parallel disks 14 and 15 fastened together by rods 16 and having attached thereto respective sets of spaced spring fingers 17 and 18 for engaging the I.D. of stub 1 and for positioning the disks centrally within pipe 1. Gasoline can flow upwardly through pipe 1 by way of the spaces between the individual spring fingers of each set. The rods 16 are bowed outwardly (convexly) slightly, to engage the I.D. of suction stub 1.

Figure 5A:
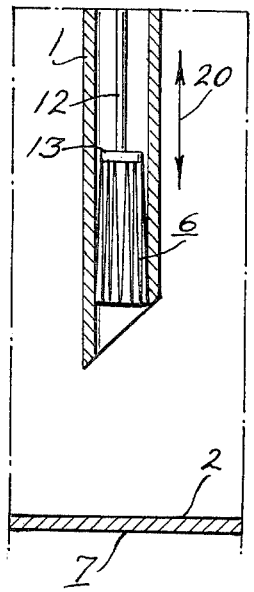
FIGS. 5A, 5B, and 5C are a series of three views illustrating three respective stages or steps during the installation of the device of this invention in a tank.
Figure 5B:
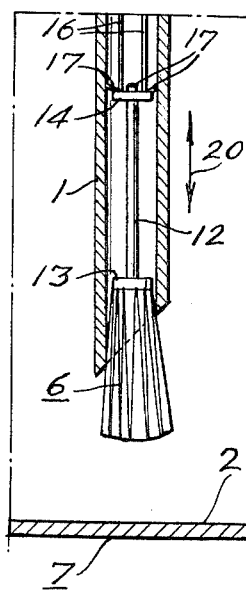
Figure 5C:
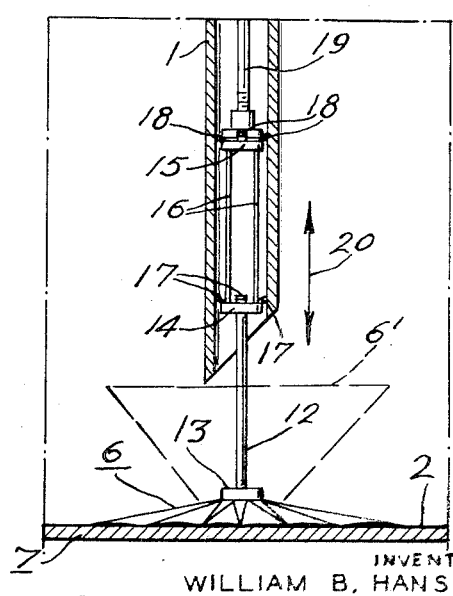

Now refer to FIGS. 5A–5C. The umbrella member 6 is made of a flexible material, such as a synthetic rubberlike material unaffected by gasoline, and is collapsed in an "inside-out" position for insertion from the surface through the check valve 9 and the suction stub 1, as illustrated in FIG. 5A. The umbrella or bowl (sump) 6 expands after leaving the lower end of the suction stub 1 at the tank bottom 2, as illustrated in FIG. 5B.

For inserting or withdrawing (removing) the member 6, a rod 19 (FIG. 5C), which extends upwardly to the surface through check valve 9 (which check valve is removed for purposes of insertion or withdrawal of member 6), is detachably secured at its lower end to the upper face of disk 15, as by a threaded coupling. For insertion of member 6 in the tank 7, rod 19 is pushed downwardly to move the assembly 6, 12–18 down through the check valve 9 and suction stub 1, as illustrated in FIGS. 5A and 5B. The member 6 expands outwardly after leaving the lower end of the suction stub 1 at the tank bottom 2 (FIG. 5B), and upon further movement downwardly, spreads out in contact with the tank bottom 2 (FIG. 5C). Further downward force exerted on rod 19 inverts the member 6, causing its outer circular edge to move upwardly, thereby bringing this member 6 to its operating position (illustrated in dotted lines at 6' in FIG. 5C) wherein it has the shape of an inverted umbrella or bowl (dish), providing a sump under the suction pipe 1 as previously described in connection with FIG. 3. Once this position has been reached, the rod 19 is detached from disk 15 and removed from the tank, following which the check valve 9 can be replaced in its housing.

For withdrawal of member 6 from the tank, the above-described procedure is reversed. The double-headed arrows 20 appearing in FIG. 5 indicate the downward movement of the member 6 assembly through pipe 1 during the insertion (installation) procedure, and the upward movement of this assembly through pipe 1 during the withdrawal (removal) procedure.

During operation, friction between the rods 16, the spring fingers 17–18 and the I.D. of pipe 1 holds the sump 6 in position below the lower end of the suction pipe.

Although there has been illustrated a threaded coupling between the rod (inserting tool) 19 and the assembly 6, 12–18, various other forms of readily detachable couplings could be used in the alternative.

The invention claimed is:

1. In combination, a subterranean liquid storage tank, a pump suction pipe mounted therein and extending substantially vertically from the top of the tank toward the bottom thereof, and a bowl-shaped member positioned below and in vertical alignment with the lower open end of said pipe, said member being open at its upper end and the cross-sectional area of said member at said upper end being large compared to that of said pipe; said member being collapsible to a size such as to be insertable into and withdrawable from said tank by way of said pipe.

2. Combination set out in claim 1, including also means attached to said member and operable from outside said tank for moving said member to its extended, operating position.

3. Combination defined in claim 2, wherein said member is sufficiently flexible to allow it to be collapsed to pass through said pipe or to be extended to its bowl-shaped operating position.

* * * * *